US010488186B2

United States Patent
Tuulos et al.

(10) Patent No.: US 10,488,186 B2
(45) Date of Patent: Nov. 26, 2019

(54) ALIGNMENT DETECTION FOR SPLIT CAMERA

(71) Applicant: Microsoft Technology Licensing, LLC, Redmond, WA (US)

(72) Inventors: Eero Tuulos, Vuorentausta (FI); Urho Konttori, Helsinki (FI); Mikko Juhola, Muurla (FI); Marko Eromaki, Tampere (FI); Eero Salmelin, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/197,154

(22) Filed: Jun. 29, 2016

(65) Prior Publication Data

US 2018/0003489 A1    Jan. 4, 2018

(51) Int. Cl.
*G01B 11/27* (2006.01)
*H04N 5/225* (2006.01)
(Continued)

(52) U.S. Cl.
CPC ............ *G01B 11/272* (2013.01); *G02B 7/003* (2013.01); *G03B 17/04* (2013.01); *G03B 17/18* (2013.01); *G06T 7/70* (2017.01); *H04M 1/0214* (2013.01); *H04M 1/0235* (2013.01); *H04M 1/0264* (2013.01); *H04N 5/2254* (2013.01); *G06T 2207/30204* (2013.01)

(58) Field of Classification Search
CPC .... G01B 11/272; H04N 5/2254; G06T 7/004; G06T 2207/30204
See application file for complete search history.

(56) References Cited

U.S. PATENT DOCUMENTS 5,778,271 A    7/1998   Kawasaki et al.
6,351,612 B1   2/2002   Misawa
(Continued)

FOREIGN PATENT DOCUMENTS

EP    2829900 A1    1/2015
WO    2014072837 A2    5/2014
WO    2016009200 A1    1/2016

OTHER PUBLICATIONS

By, A., "Aligning Optics," Vision Systems Design Website, Available Online at http://www.vision-systems.com/articles/print/volume-16/issue-4/features/aligning-optics.html, Apr. 1, 2011, 7 pages.
(Continued)

*Primary Examiner* — Christopher S Kelley
*Assistant Examiner* — Nasim N Nirjhar
(74) *Attorney, Agent, or Firm* — Alleman Hall Creasman & Tuttle LLP

(57) ABSTRACT

An electronic device comprises a camera and a retaining member. The camera includes an objective portion configured to collect light from a subject, a sensor portion reversibly separable from the objective portion, and a computer configured to return an indication of alignment of the objective and sensor portions based on output of one or more optical sensor elements of the sensor portion. The retaining member is configured to couple the objective portion to the sensor portion when the objective and sensor portions are aligned and also when the objective portion is separated from the sensor portion.

20 Claims, 11 Drawing Sheets

(51) Int. Cl.
   *G02B 7/00* (2006.01)
   *G03B 17/04* (2006.01)
   *H04M 1/02* (2006.01)
   *G03B 17/18* (2006.01)
   *G06T 7/70* (2017.01)

(56) References Cited

U.S. PATENT DOCUMENTS

| | | | |
|---|---|---|---|
| 7,058,433 B2 | 6/2006 | Carpenter | |
| 7,139,473 B2 | 11/2006 | Shimano et al. | |
| 7,625,144 B2 | 12/2009 | Kranz et al. | |
| 8,098,319 B2 | 1/2012 | Demuynck | |
| 8,194,182 B2 | 6/2012 | Kinoshita | |
| 8,275,249 B2 | 9/2012 | Imura et al. | |
| 8,325,265 B2 | 12/2012 | Chen | |
| 8,400,564 B2 | 3/2013 | Jacobs | |
| 8,545,114 B2 | 10/2013 | Pavithran et al. | |
| 8,639,106 B1* | 1/2014 | Gleason | G03B 3/10 396/133 |
| 8,730,599 B2 | 5/2014 | Topliss | |
| 8,804,255 B2 | 8/2014 | Duparre | |
| 9,001,268 B2 | 4/2015 | Azuma et al. | |
| 2005/0213790 A1* | 9/2005 | Rhoads | G06Q 30/02 382/100 |
| 2006/0045327 A1 | 3/2006 | Dang et al. | |
| 2006/0066855 A1* | 3/2006 | Boef | G03F 7/70341 356/401 |
| 2006/0142053 A1 | 6/2006 | Garcia et al. | |
| 2007/0077052 A1 | 4/2007 | Chang | |
| 2007/0263067 A1 | 11/2007 | Huang et al. | |
| 2008/0165439 A1 | 7/2008 | Chang | |
| 2008/0304818 A1 | 12/2008 | Kranz et al. | |
| 2009/0059043 A1 | 3/2009 | Demuynck | |
| 2009/0252488 A1 | 10/2009 | Eromaki et al. | |
| 2010/0045855 A1 | 2/2010 | Tanida et al. | |
| 2010/0053394 A1* | 3/2010 | Kinoshita | G03B 17/00 348/294 |
| 2010/0103307 A1 | 4/2010 | Iwasaki | |
| 2010/0111396 A1* | 5/2010 | Boucheron | G06K 9/0014 382/133 |
| 2011/0150441 A1 | 6/2011 | Ollila et al. | |
| 2013/0076964 A1 | 3/2013 | Sirpal et al. | |
| 2013/0314587 A1 | 11/2013 | Kriman et al. | |
| 2014/0002676 A1 | 1/2014 | Ning | |
| 2014/0009631 A1 | 1/2014 | Topliss | |
| 2014/0028887 A1 | 1/2014 | Azuma | |
| 2014/0106822 A1 | 4/2014 | Smith et al. | |
| 2014/0184881 A1 | 7/2014 | McKinley | |
| 2014/0340537 A1 | 11/2014 | Eromaki | |
| 2015/0192750 A1 | 7/2015 | Shiraishi | |
| 2016/0007925 A1* | 1/2016 | Mirov | A61B 5/02427 356/400 |
| 2016/0033739 A1 | 2/2016 | Topliss | |
| 2016/0190958 A1 | 6/2016 | Gutierrez et al. | |
| 2016/0261806 A1 | 9/2016 | Honjo et al. | |
| 2016/0356978 A1* | 12/2016 | Osborne | G02B 7/004 |
| 2017/0147844 A1* | 5/2017 | Feng | G02B 7/005 |

OTHER PUBLICATIONS

Pierce, D., "Sony Tablet P review," The Verge Website, Available Online at http://www.theverge.com/2012/3/6/2847197/sony-tablet-p-review, Mar. 6, 2012, 8 pages.

"Final Office Action Issued in U.S. Appl. No. 15/197,273", dated Jun. 14, 2018, 12 Pages.

"Non Final Office Action Issued in U.S. Appl. No. 15/197,273", dated Nov. 6, 2017, 10 Pages.

"Non Final Office Action Issued in U.S. Appl. No. 15/197,273", dated Nov. 29, 2018, 11 pages.

"Promaster", Published on: Jan. 30, 2015 Available at: https://www4.uwm.edu/psoa_er/manuals/cameras/2500PK.pdf.

ISA European Patent Office, International Search Report and Written Opinion Issued in PCT Application No. PCT/US2017/037097, dated Oct. 4, 2017, WIPO, 14 pages.

ISA European Patent Office, International Search Report and Written Opinion Issued in PCT Application No. PCT/US2017/037098, dated Oct. 4, 2017, WIPO, 14 pages.

"Final Office Action Issued in U.S. Appl. No. 15/197,273", dated Jun. 12, 2019, 12 Pages.

* cited by examiner

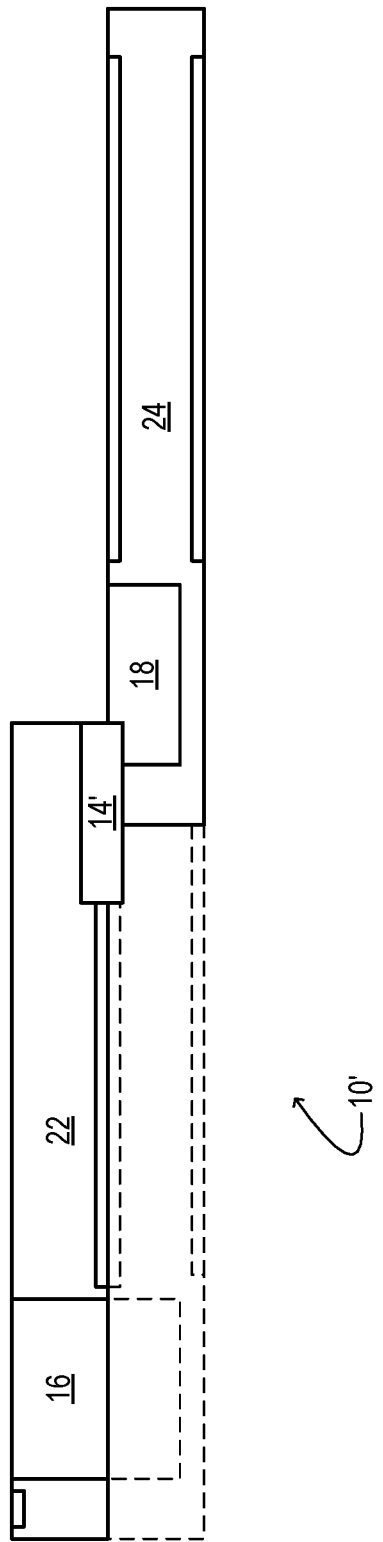

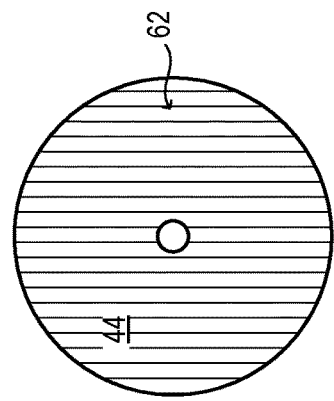
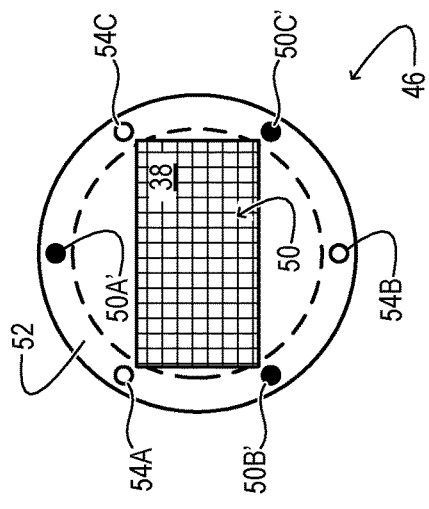
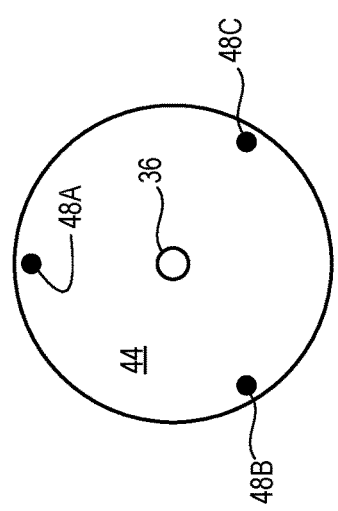
FIG. 4C
FIG. 4B
FIG. 4A

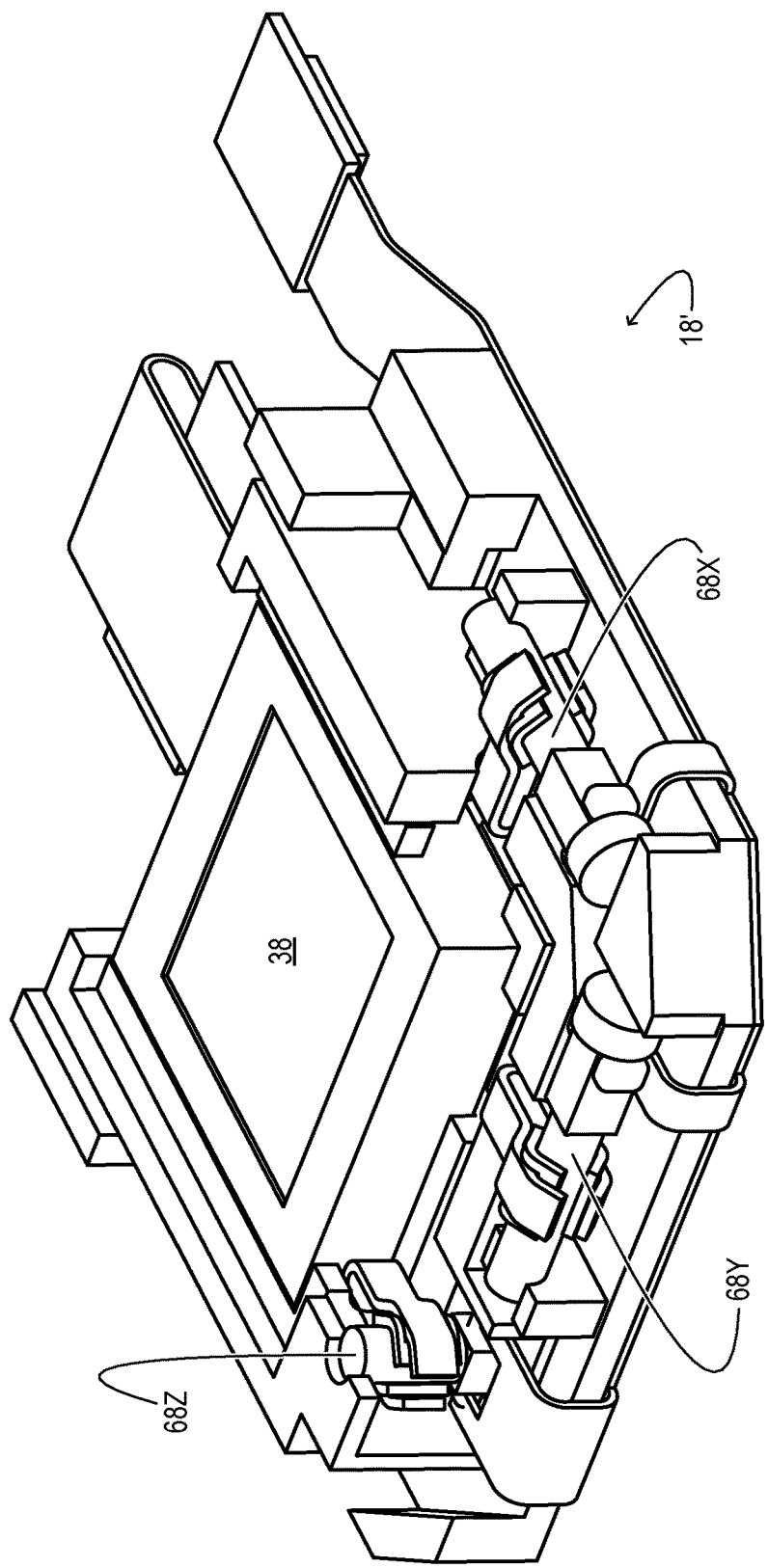

ALIGNMENT DETECTION FOR SPLIT CAMERA

BACKGROUND

Handheld electronic devices with integrated cameras are ubiquitous in the consumer market. Driven by user-comfort and aesthetic considerations, very thin handheld devices are increasingly desirable. Engineering extreme thinness in a camera may be challenging, however, as the focal length of the objective lens system of the camera imposes a lower limit on the thickness. Moreover, the overall rigidity of a handheld device is apt to decrease as the device is made thinner. Loss of rigidity is problematic for optical systems such as cameras, which require precise alignment of internal componentry.

SUMMARY

One embodiment is directed to an electronic device comprising a camera and a retaining member. The camera includes an objective portion configured to collect light from a subject, a sensor portion reversibly separable from the objective portion, and a computer configured to return an indication of alignment of the objective and sensor portions based on output of one or more optical sensor elements of the sensor portion. The retaining member is configured to couple the objective portion to the sensor portion when the objective and sensor portions are aligned and also when the objective portion is separated from the sensor portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows aspects of another handheld electronic device.

FIG. 4A shows aspects of an example objective portion of a camera component of a handheld electronic device.

FIG. 4B shows aspects of an example sensor portion of a camera component of a handheld electronic device.

FIG. 4C shows aspects of another objective portion of a camera component of a handheld electronic device.

DETAILED DESCRIPTION

Figure 1A:
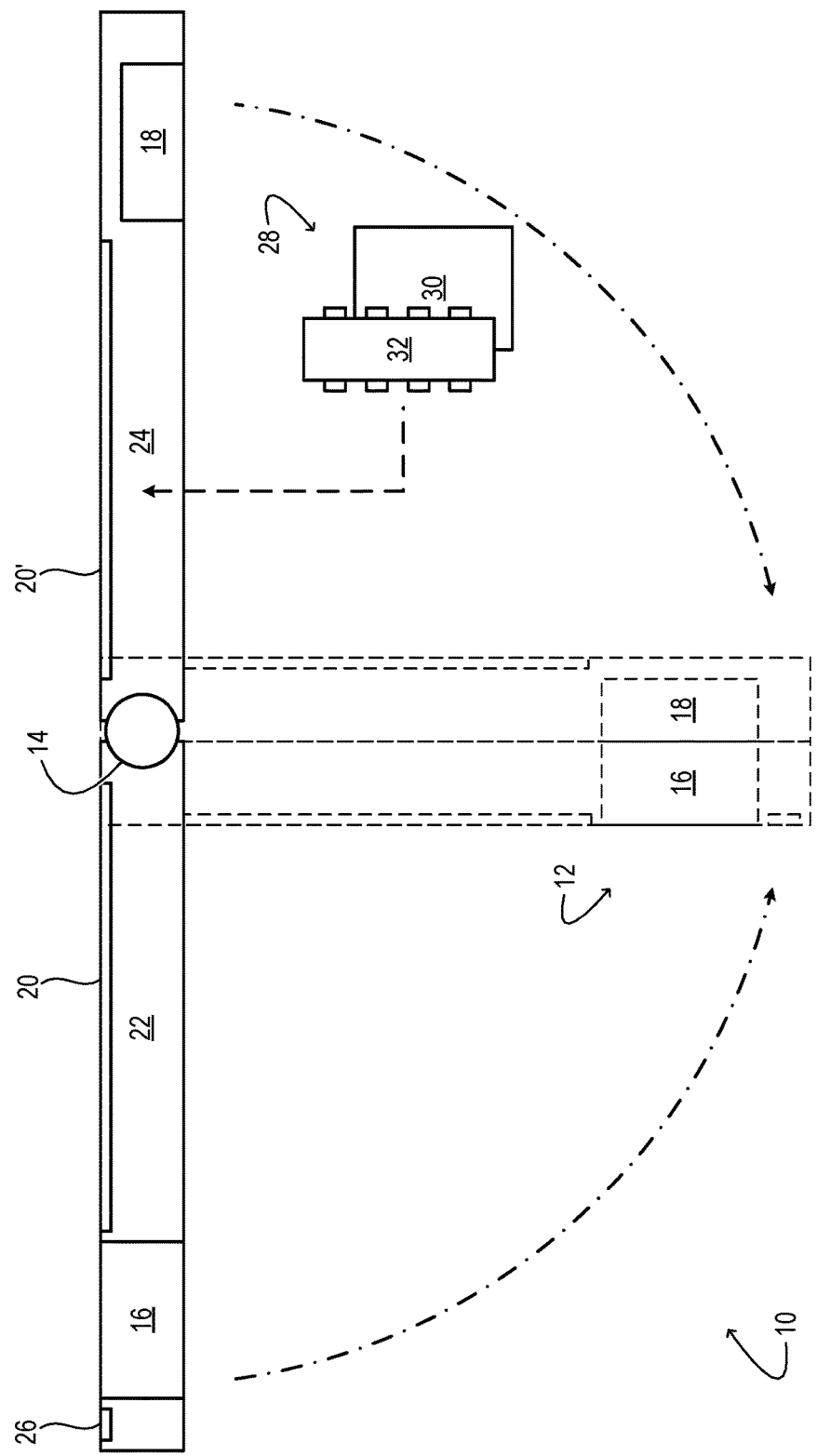
FIGS. 1A, 1B, 1C, and 1D show aspects of an example handheld electronic device.

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Unless otherwise noted, the various drawing scales, aspect ratios, and numbers of components shown in the figures may be purposely distorted to make certain features or relationships easier to see.

FIG. 1A shows aspects of an example handheld electronic device 10. The handheld device of FIG. 1 includes a camera component 12 in two portions detachable from each other, and a retaining member 14 that connects the two portions. The handheld device may be embodied as a smartphone, tablet, or laptop computer system, for example. Handheld device 10 is configured to be transitionable, manually, between an unfolded state (drawn in solid lines) and a folded state (drawn in broken lines). The handheld device may be usable in both states, while some features of the device may be available only in one state or in the other.

Camera component 12 of handheld device 10 is not particularly limited with respect to function; it may be a digital color camera, a night-vision camera, a video camera, a depth-imaging camera, etc. As shown in FIG. 1A, the camera component includes an objective portion 16 and a sensor portion 18. The objective portion is configured to collect light from a photographic subject. The sensor portion is configured to capture an image of the subject using light collected by the objective portion. Because the handheld device can be unfolded and refolded, the sensor portion is reversibly separable from the objective portion. In the embodiment of FIG. 1A, handheld device 10 is usable as a camera only in the folded state, when the objective and sensor portions are adjacent to, and aligned with each other.

By dividing camera component 12 into two opposing portions, the configuration of FIG. 1A partitions the focal length of the camera component between the two portions. This configuration allows each of the opposing portions, if engineered with equal or comparable thickness, to be relatively thin. In some embodiments, objective portion 16 and sensor portion 18 are each 3 to 5 millimeters in thickness. Each portion having equal or comparable thickness is desirable if handheld device 10 is engineered to lie flat in the unfolded state. Despite these advantages, other embodiments are envisaged in which the objective and sensor portions have different thicknesses.

In the embodiment of FIG. 1A, at least one display panel (display panel 20, 20', for example) is coupled to each of objective portion 16 and sensor portion 18. Each display panel may be an organic light-emitting diode (OLED) or liquid-crystal display (LCD) panel, as nonlimiting examples. In some examples, one or more of the display panels may support a resistive or capacitive touch screen. Continuing in FIG. 1A, objective portion 16 is coupled via objective housing 22 to components on one side of retaining member 14; the sensor portion is coupled via sensor housing 24 to components on the opposite side of the retaining member.

Handheld device 10 also includes a flash 26 and other hardware components not shown in FIG. 1A—cellular, WiFi, and Bluetooth radios, a global-positioning system (GPS) receiver, an inertial-measurement unit, for example. The various hardware components of the handheld device are operatively coupled to computer 28, which includes a logic machine 30 and an associated electronic memory machine 32. The electronic memory machine may hold instructions that cause the logic machine to execute the various computing actions and processes disclosed herein.

Figure 1B:
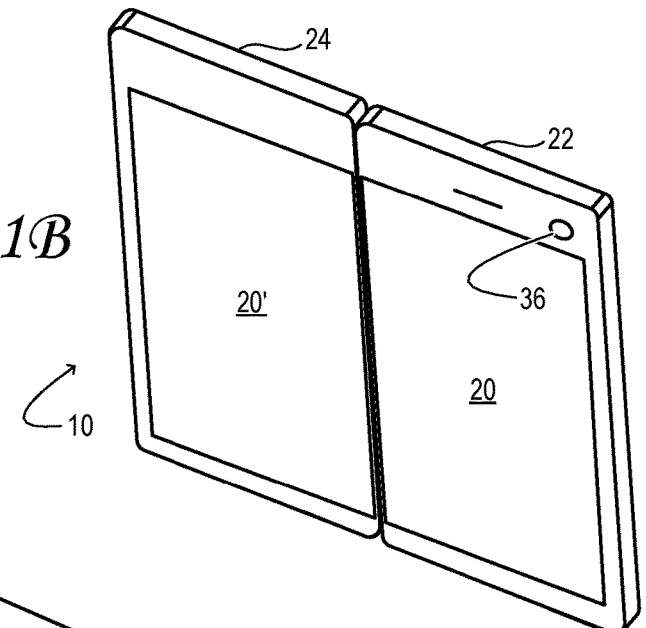
Figure 1C:
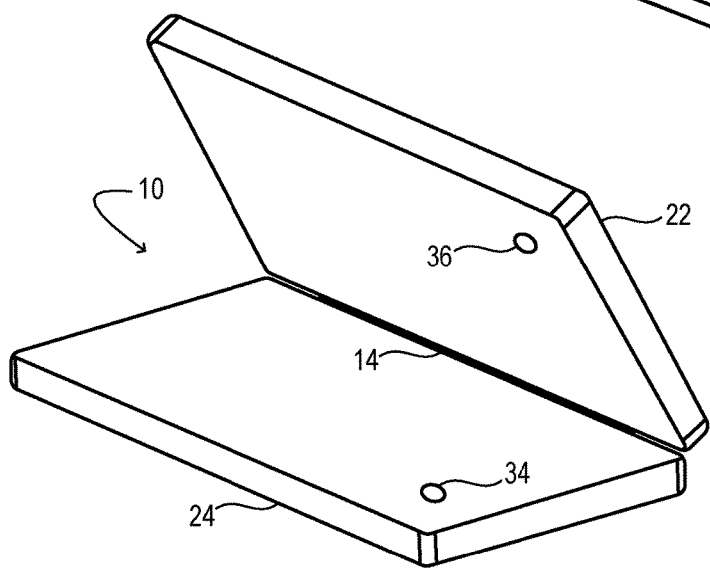
Figure 1D:
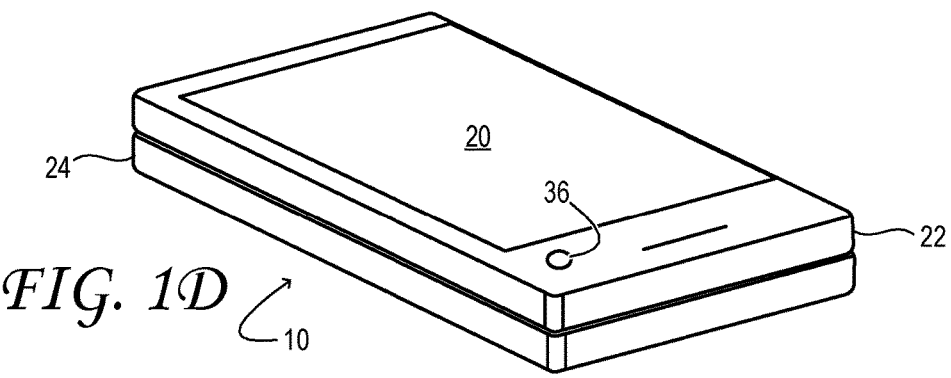

Continuing in FIG. 1A, retaining member 14 of handheld device 10 ensures that objective portion 16 remains connected to sensor portion 18 when the objective and sensor portions are aligned (such that camera component 12 is usable), and also when the objective portion is separated from the sensor portion. In the embodiment of FIG. 1A, the retaining member includes a hinge. Hinged transitioning between folded and unfolded states of the handheld device is further illustrated in the perspective drawings of FIGS. 1B, 1C, and 1D. FIG. 1B shows the handheld device in the unfolded state. FIG. 1D shows the handheld device in the folded state, iris 34 of the sensor portion aligning with aperture 36 of the objective portion. FIG. 1C shows the handheld device in a partially folded state. Despite the benefits that a folding handheld device offers, other reversibly separable camera geometries are also envisaged. In the embodiment of FIG. 2, retaining member 14' of handheld device 10" takes the form of a slide that glides along opposite edges of objective housing 22 or sensor housing 24. In these and other embodiments, the handheld device may include a mechanical or magnetic latch (not shown in the drawings) to discourage separation of the objective and sensor portions when aligned.

Figure 3:
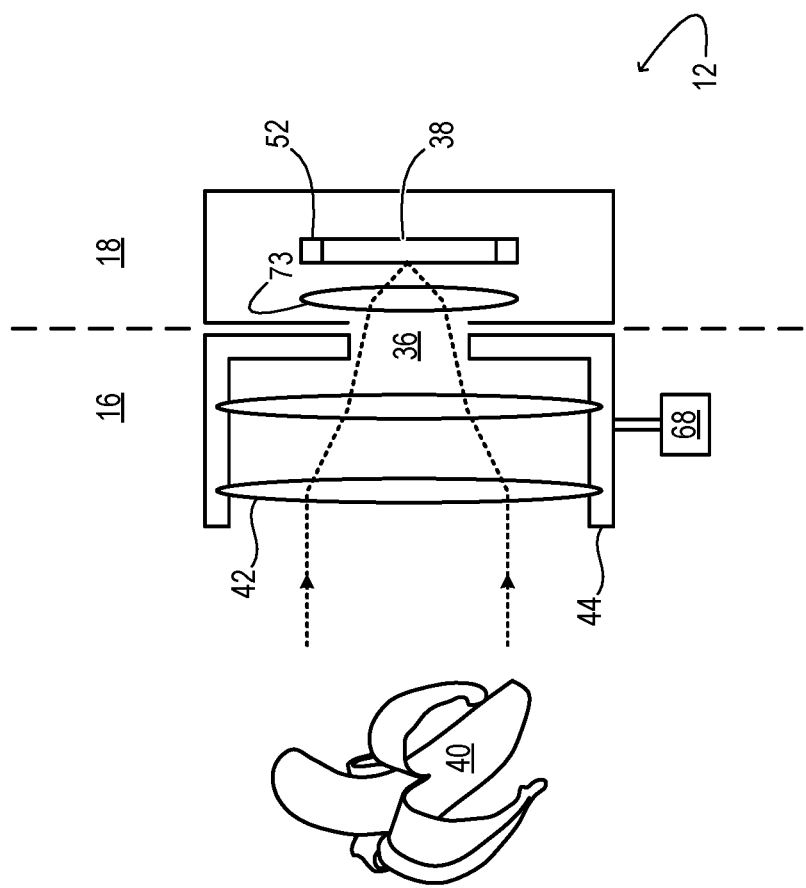
FIG. 3 shows aspects of an example camera component of a handheld electronic device.

FIG. 3 shows aspects of an example camera portion 12 of handheld device 10. The drawing schematically shows objective portion 16 and sensor portion 18. Sensor portion 18 includes an optical sensor array 38—a rectangular array of optical sensor elements configured to digitally record an image of photographic subject 40. The objective portion includes a barrel lens system 42 that collects light from the subject and directs the light through aperture 36, forming an image of the subject on the optical sensor array.

No aspect of the drawings should be construed in a limiting sense, for numerous alternative configurations are equally envisaged. Although barrel lens system 42 is shown, for instance, as a single unit contained within objective portion 16, other acceptable lens systems may include one or more lenses arranged in objective portion 16, and one or more lenses arranged in sensor portion 18. Here, the one or more lenses of the objective portion are configured to collect the light from the subject, and the one or more lenses of the sensor portion are configured to receive and convey the light to an optical sensor array of the sensor portion. This variant would still provide the advantage of dividing the focal length of the objective lens system between the objective and sensor portions. Still other examples may employ a folded optical path in which the subject image received from the objective portion is conveyed to optical sensor array 38 via a waveguide arranged in the sensor portion.

FIG. 3 shows the objective and sensor portions in proper alignment. Naturally, the objective and sensor portions must be aligned to enable high-quality imaging of the subject. To sense the state of alignment between the objective and sensor portions, especially in view of the separability of these portions in handheld device 10, camera component 12 incorporates an alignment-sensing system. As described in further detail below, the alignment-sensing system may be distributed among objective portion 16, sensor portion 18, and computer 28 of the handheld device.

FIG. 4A shows additional aspects of objective portion 16 of camera component 12, and FIG. 4B shows additional aspects of sensor portion 18. In particular, FIG. 4A shows end face 44 of barrel lens system 42 in one non-limiting embodiment. Shown specifically is the end face of the barrel lens system that would be oriented opposite sensor portion 18 (and visible to one or more sensor elements of the sensor portion) in the aligned camera component 12; FIG. 4B shows the opposing face 46 of the sensor portion. Arranged on end face 44 are a plurality of alignment markers (alignment markers 48A, 48B, 48C, for example). The number, nature, and arrangement of the alignment markers may differ in different embodiments.

As noted above, optical sensor array 38 of sensor portion 18 includes a plurality of optical sensor elements 50. Additional, peripheral sensor elements 50' (sensor elements 50A', 50B', 50C', for example) may be arranged on periphery 52 of the optical sensor array. The peripheral sensor elements may be discrete, non-imaging photodiodes, for example. In some embodiments, one or more optical sensor elements of the sensor portion are configured to sense the position of one or more of the alignment markers 48 when the objective and sensor portions approach alignment.

In some embodiments, alignment markers 48 may be self-illuminating. Each alignment marker may include a light-emitting diode (LED), for example. In other embodiments, the alignment markers may be externally illuminated. The use of non-visible light for alignment sensing may, in some examples, protect the subject image from degradation by stray light. Accordingly, each alignment marker may include a fluorescent material excitable in the ultraviolet and emissive in the infrared. To provide illumination of the alignment markers, at least when the objective and sensor portions approach alignment, one or more light emitters 54 (light emitters 54A, 54B, 54C, for example) are arranged on periphery 52 of the optical sensor array. In other embodiments, the one or more light emitters may be arranged in objective portion 16. In examples in which the alignment markers are fluorescent, each light emitter may be an ultraviolet-emitting LED. In other examples, the alignment markers may be absorptive, reflective, or diffractive, and light emitters 54 may emit visible or infrared light. Each of the one or more alignment markers, for instance, may include a reflector to reflect the emitter light back towards sensor portion 18. In other examples, the alignment markers may be less reflective than surrounding regions of end face 44. The alignment markers may be embodied each as a spot of darkly colored material, for instance.

In some embodiments, one or more lenses may be arranged within camera component 12 to collect light from alignment markers 48, to improve detection by the one or more optical sensor elements 50. A lenslet, for example, may be coupled to each of the peripheral sensor elements 50'. Alternatively, or in addition, a lenslet may be coupled to each of the alignment markers 48 and configured to focus an image of the alignment marker onto the one or more sensor elements.

Computer 28 is configured to return an indication of alignment between objective portion 16 and sensor portion 18 based on the output of the one or more optical sensor elements 50 or 50'. In some embodiments, the indication of alignment may be Boolean-valued—i.e., aligned or not aligned. In other embodiments, the indication of alignment may be vector-valued, with components specifying a degree of misalignment along and/or around a plurality of different axes. Each component may include an independent measure of alignment accuracy in an associated direction—the alignment accuracy being inversely related to the degree of misalignment.

In some embodiments, the indication of alignment may include an indication of translational alignment along orthogonal X and Y axes. These axes may correspond to the horizontal and vertical directions, respectively. The indication may reveal, for example, that the objective portion is offset M pixels above and N pixels to the right of the sensor portion.

The indication of alignment may include an indication of tilt (i.e., small-angle rotational) alignment around one or more axes. Tilt alignment may be expressed relative to the optical axis of optical sensor array 38. The indication may reveal, for example, that objective portion 16 is rotated N degrees from the optical axis of the sensor portion, in the horizontal plane.

The indication of alignment may also include an indication of focal alignment—i.e., alignment of the focal point of the subject image to the plane of optical sensor array 38, with misalignment indicating displacement of the focal point behind or in front of the optical sensor array, in a direction normal to the plane.

Proper alignment between objective portion 16 and sensor portion 18 may be indicated by each alignment marker 48 being found at its expected coordinates. For instance, if optical sensor array 38 is used to sense alignment, then a given alignment marker i might be expected at pixel position $(X_{0,i}, Y_{0,i})$ of the optical sensor array. Horizontal misalignment is indicated when the alignment marker is observed at $(X_{0,i}+\delta, Y_{0,i})$, or not at all. Vertical misalignment is indicated when the alignment marker is observed at $(X_{0,i}, Y_{0,i}+\delta)$, or not at all.

Figure 5B:
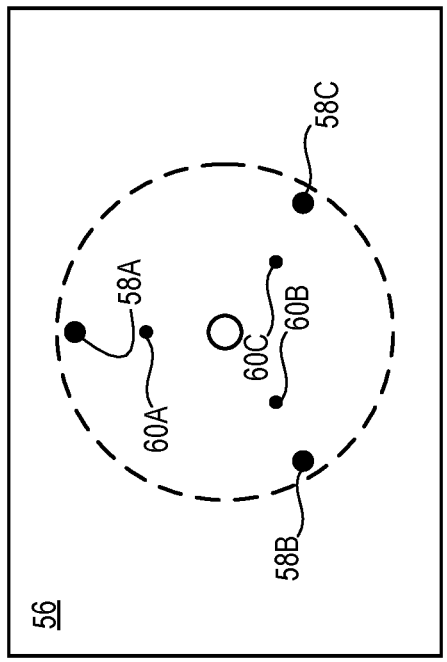
FIG. 5B illustrates an effect of focal misalignment on a pattern of alignment markers of an example camera component.
Figure 5A:
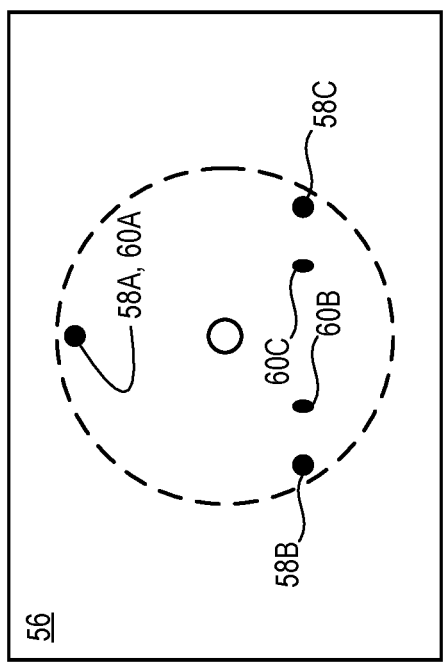
FIG. 5A illustrates an effect of tilt misalignment on a pattern of alignment markers of an example camera component.

FIG. 5A illustrates the effect of tilt misalignment about the vertical axis on the pattern of alignment markers 48. In FIG. 5A, image 56 of end face 44 shows the expected positions 58A, 58B, and 58C of the alignment markers and the corresponding observed positions 60A, 60B, 60C of the alignment markers. Likewise, FIG. 5B illustrates the effect of focal misalignment along the optical axis of optical sensor array 38. Alternatively, or in addition, combined assessment of tilt and focal alignment may be based on the quality of focus of the imaged alignment markers or from the degree of keystoning of the alignment-marker pattern, with reference to an appropriate camera model.

In embodiments in which peripheral sensor elements 50' are used to detect corresponding alignment markers 48, each peripheral sensor element may report a Boolean figure of merit—i.e., aligned versus not aligned—or, for small amounts of misalignment, an analog surrogate of the distance between an alignment marker and its expected position. When analog-surrogate data from a plurality of peripheral sensors are processed together—e.g., fit to a polynomial—a detailed assessment of the state of alignment may be obtained.

Alignment sensing in camera component 12 may rely on other principles of operation besides locating alignment markers 48 per se. In some embodiments, as shown in FIG. 4C, each alignment marker may take the form of a scratch or embossed line formed in end face 44 of objective portion 16. A great many alignment features of this kind may be arranged on the end face, together constituting a diffraction grating 62 or other hologram. Light emitter 54 of opposing face 46 may take the form of a diode laser arranged on the periphery 52 of optical sensor array 38. The diffraction grating or hologram may be configured, when excited by the laser, to project an interference pattern onto the optical sensor array. The interference pattern may include alternating bright and dark bands, for instance, the position of which may be used to assess alignment between objective portion 14 and sensor portion 16.

In still other embodiments, alignment sensing may take advantage of the fact that objective portion 16 will naturally project an image of aperture 36 onto optical sensor array 38 when objective portion 16 and sensor portion 18 approach a state of alignment, provided that subject 40 is adequately illuminated. An oversized optical sensor array may be configured to capture the image of the aperture. Computer 28 may be configured to return an indication of alignment of the objective and sensor portions based on the image of the aperture as captured by the optical sensor array.

Figure 6A:
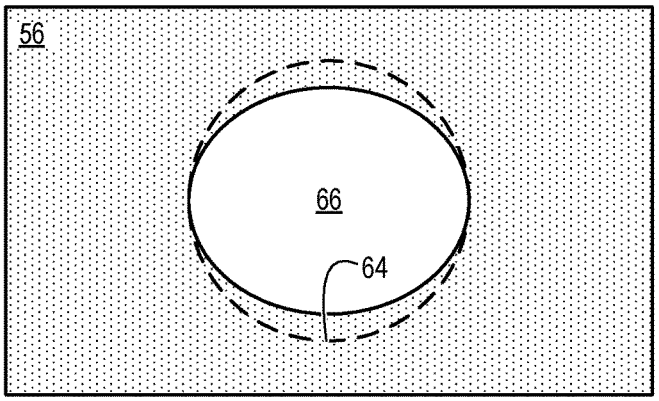
FIGS. 6A and 6B illustrate effects of translational misalignment on an aperture image of an example camera component.
Figure 6B:
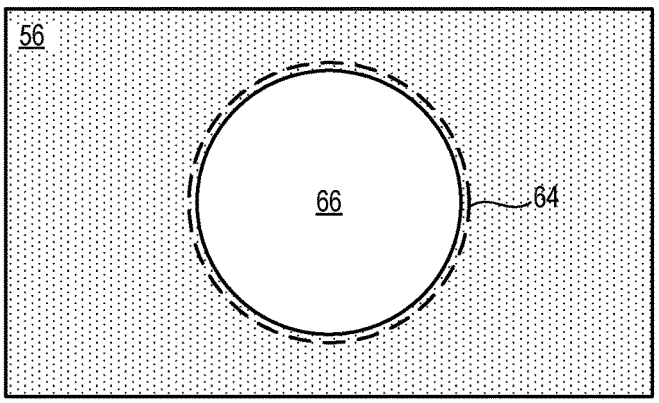
Figure 6C:
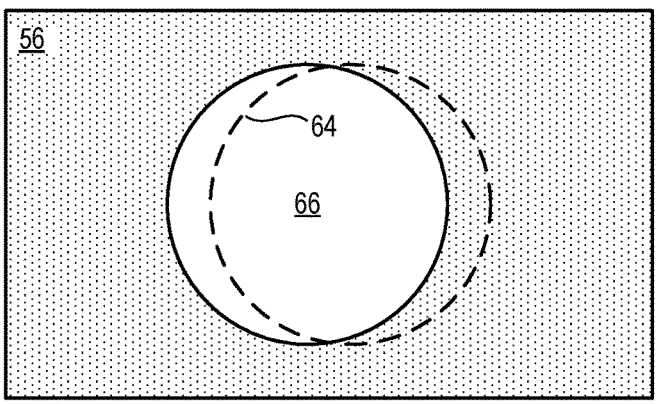
FIG. 6C illustrates an effect of tilt misalignment on an aperture image of an example camera component.
Figure 6D:
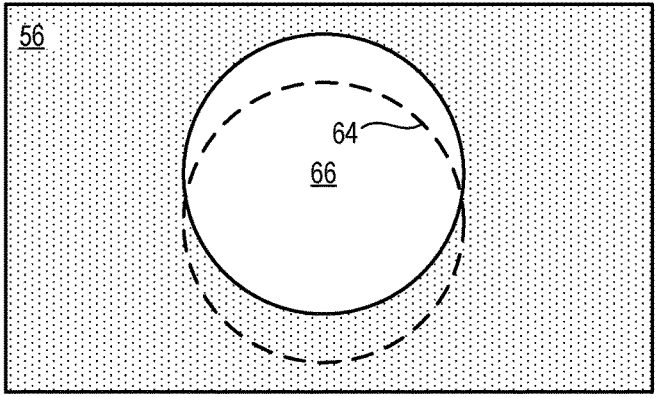
FIG. 6D illustrates an effect of focal misalignment on an aperture image of an example camera component.

As in the previous embodiments, the indication of alignment may include an indication of translational alignment and an independent indication of tilt and/or focal alignment. When objective portion 16 is perfectly aligned to sensor portion 18, the image of aperture 36 on optical sensor array 38 is a circle 64 of a predetermined radius, centered at predetermined coordinates $(X_0, Y_0)$ of the optical sensor array, as shown in FIG. 6A. The effect of tilt misalignment is to compress the circle into an ellipse 66, also shown in FIG. 6A. The effect of focal misalignment is to blur and change the diameter of the circle (or ellipse, if tilt misalignment is also present), as shown in FIG. 6B. The effect of horizontal misalignment is to shift the center of the circle (or focus of the ellipse) to the left or right, as shown in FIG. 6C. The effect of vertical misalignment is to shift the center of the circle (or focus of the ellipse) up or down, as shown in FIG. 6D.

In view of the foregoing analysis, the image of the aperture on the optical sensor array 38 is understood to be elliptical in general terms. The indication of tilt alignment assessed in this embodiment may vary based on the eccentricity of the elliptical image of the aperture (e.g., the ratio of the distance between the two foci of the ellipse to the length of the major axis). The indication of focal alignment may vary based on the diameter of the elliptical image of the aperture (e.g., the length of the major axis). The indication of translational alignment may vary based on the position of the center of the elliptical image of the aperture. In order to evaluate the eccentricity, diameter, and position of the elliptical center, computer 28 may be configured to apply a curve-fitting routine to the high-contrast boundary of the aperture image.

Computer 28 may be configured to schedule alignment sensing operations so as to usefully inform, but not interfere with, subject image capture. For instance, alignment sensing may be enacted automatically every time handheld device 10 is folded shut, or handheld device 10' is slid into the closed position. In other examples, alignment sensing may be triggered by a user request to capture a subject image, provided that a certain period of time has elapsed since the previous image capture. In other examples, alignment sensing may be enacted immediately before every subject image capture.

The ability to sense misalignment between objective portion 16 and sensor portion 18 enables various actions to be taken to improve the user experience associated with handheld device 10. In the simplest case, camera component 12 may be deactivated and/or the user alerted when significant misalignment is sensed. This action may prevent the user from recording images destined to be unsatisfactory. In other embodiments, corrective action may be taken to improve the quality of the captured image. The corrective action may include correcting the image digitally, when the degree of misalignment is not severe. In still other embodiments, handheld device 10 may include electromotive componentry configured to dynamically realign the objective or sensor portions, to ensure quality imaging.

Returning now to FIG. 3, camera component 12 includes a linear actuator 68 configured to move objective portion 16 pursuant to control signals from computer 28. In other embodiments, the linear actuator may be configured to move sensor portion 18. In either case, the computer may be configured to control the linear actuator responsive to an indication of alignment of objective portion 16 and sensor portion 18, so as to properly align the objective and sensor portions. The indication may be received from the alignment sensing system of the camera component, as described hereinabove.

Figure 7:
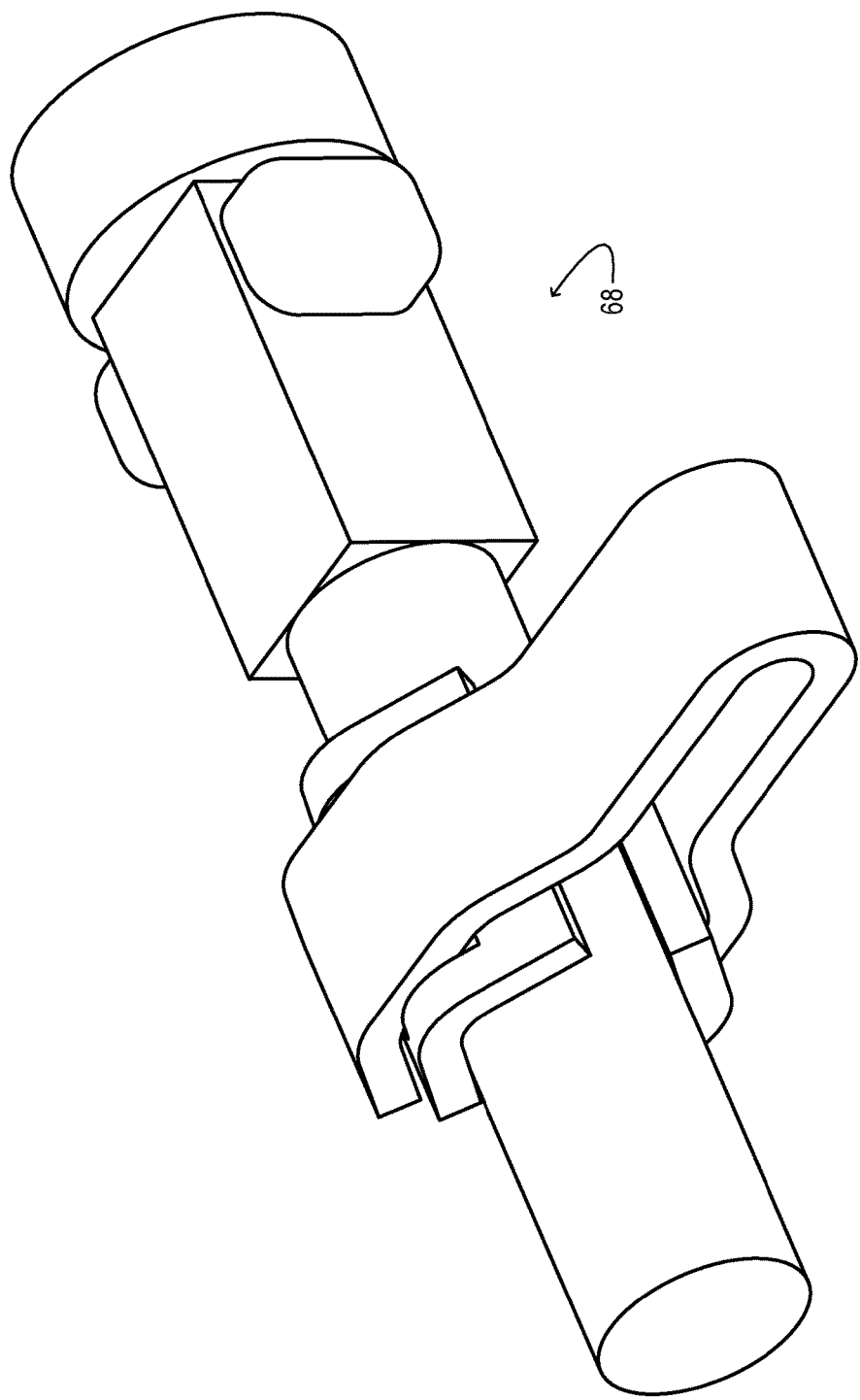
FIG. 7 shows aspects of an example piezoelectric linear actuator.

The mode of operation of linear actuator 68 is not particularly limited. The linear actuator may be electromechanical or piezoelectric, for example. FIG. 7 shows aspects of a piezoelectric linear actuator 68 in one embodiment.

Figure 8B:
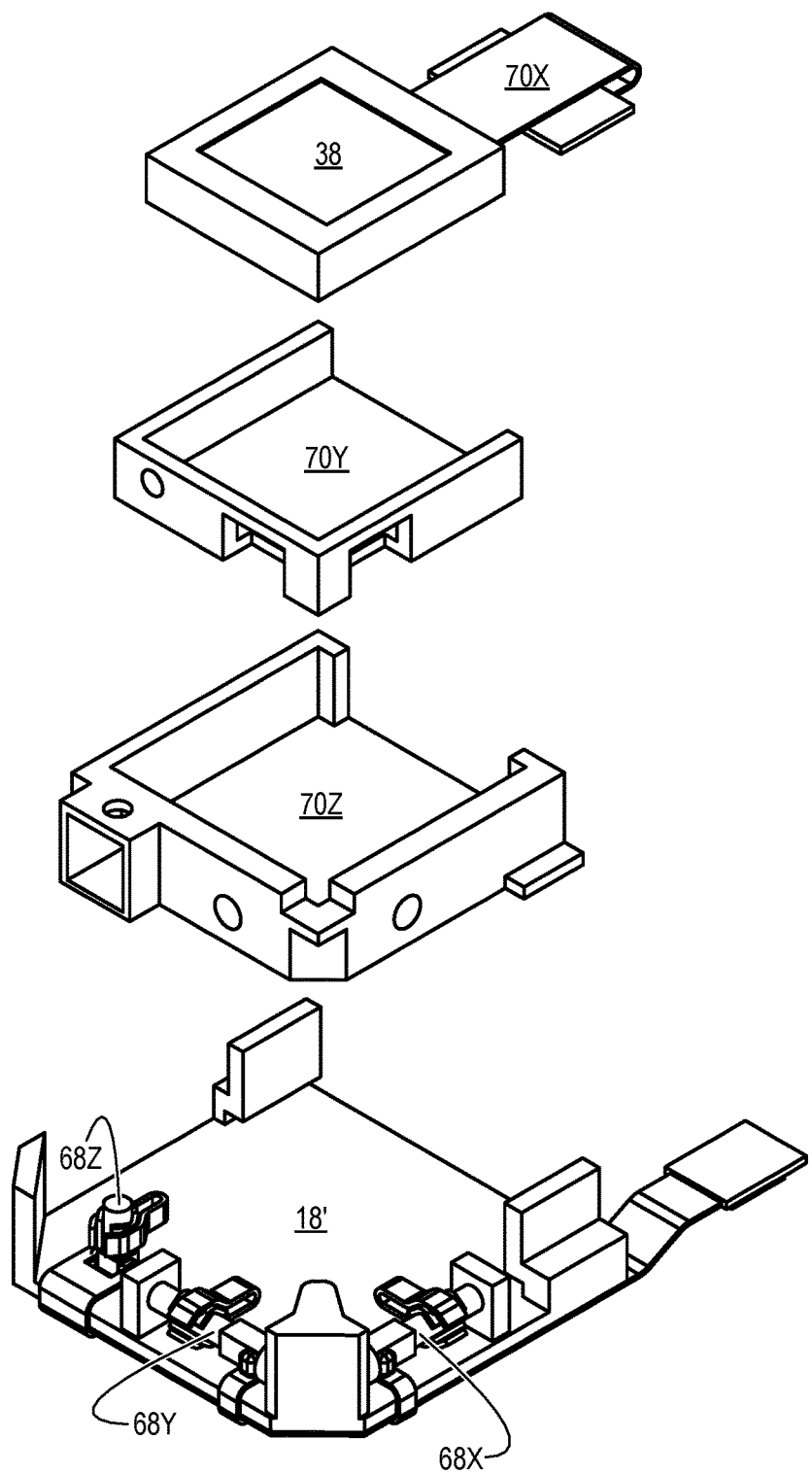
FIG. 8A and exploded FIG. 8B show aspects of another sensor portion of a camera component.

In some embodiments, camera component 12 may include a plurality of linear actuators configured to move (translate or tilt) objective portion 16 or sensor portion 18 in a corresponding plurality of directions. FIG. 8A shows an example sensor portion 18' having three different translational linear actuators 68X, 68Y, and 68Z. FIG. 8B provides an exploded view of sensor portion 18'. In this embodiment, each of the translational linear actuators is coupled to a corresponding floating stage of the sensor portion—stages 70X, 70Y, and 70Z, specifically. In other embodiments, the linear actuators may instead be configured to move objective portion 16, and the floating and/or rotating stages would then be arranged in the objective portion.

Figure 9:
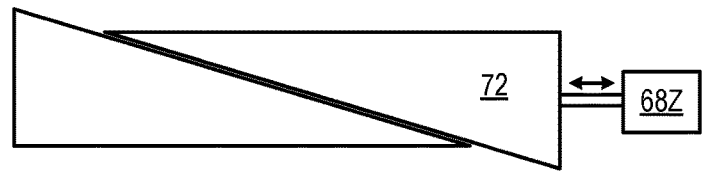
FIG. 9 illustrates use of a linear actuator for depth realignment in an example camera component.

In some embodiments, a linear actuator may be configured to address focal misalignment of objective portion 16 relative to sensor portion 18. As shown in FIG. 9, a linear actuator 68' may be configured to slide one transparent wedge 72 along another, to increase the effective optical path between the objective and sensor portions, by moving the objective or sensor portion in the depth direction. Despite the utility of using a linear actuator for depth adjustment, other actuators and/or focal-correcting strategies are equally consonant with this disclosure. One alternative is to incorporate an electrooptical lens having an electronically tunable focal length, in one or both of the objective and sensor portions. In FIG. 3, for example, lens 73 may be an electrooptical lens.

Figure 10:
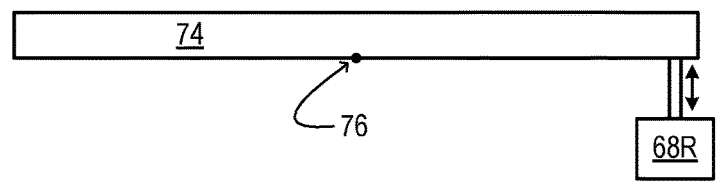
FIG. 10 illustrates use of a linear actuator for tilt realignment in an example camera component.

In some embodiments, floating stage 70Z may be replaced by a rotational stage 74, as shown in FIG. 10, having a fulcrum 76. Linear actuator 68R, with little or no modification, could then effect tilt realignment of the objective or sensor portion.

Figure 11:
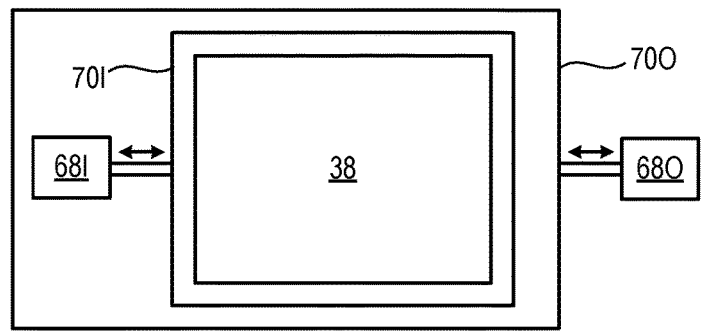
FIG. 11 illustrates use of a plurality of linear actuators for translational realignment in an example camera component.

In some embodiments, camera component 12 may include a plurality of linear actuators configured to move the objective or sensor portion in the same direction. FIG. 11 shows, for example, an outer linear actuator 680 and an inner linear actuator 681. The outer linear actuator has a longer stroke and is more frequency-damped than the inner actuator. The outer linear actuator moves a floating stage 700 on which the inner actuator is coupled. The inner linear actuator moves floating stage 701, on which optical sensor array 38 may be coupled. In some embodiments, the inner linear actuator may provide optical image stabilization (OIS) for camera component 12. In alternative embodiments, the inner linear actuator may provide the longer stroke.

It was noted above that alignment sensing in handheld device 10 may be scheduled to inform, but not interfere with subject-image capture. The same is true of the active realignment methods disclosed herein. In particular, computer 28 may be configured to schedule the realignment automatically upon closure of the handheld device, at the first user request to capture a subject image since the handheld device was folded closed, before every subject capture, etc. In some embodiments, alignment sensing and active realignment may be enacted together, in a closed-loop manner, to ensure proper alignment of camera portion 12.

The methods and processes described herein may be tied to a computer system of one or more computer devices. In particular, such methods and processes may be implemented as a computer-application program or service, an application-programming interface (API), a library, and/or other computer-program product.

FIG. 1A schematically shows a non-limiting embodiment of a computer 28 of handheld device 10 that can enact one or more of the methods and processes described above.

Computer 28 includes a logic machine 30 and an associated electronic memory machine 32. Computer 28 may be operatively coupled to a display subsystem, input subsystem, communication subsystem, and/or other components not shown in FIG. 1A.

Logic machine 30 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 30 may be one of a plurality of logic machines configured to execute software instructions. Additionally or alternatively, the logic machine may include one or more hardware or firmware logic machines configured to execute hardware or firmware instructions. Logic machines of computer 28 may be single-core or multi-core, and the instructions executed thereon may be configured for sequential, parallel, and/or distributed processing. Individual components of the computer optionally may be distributed among two or more separate devices, which may be remotely located and/or configured for coordinated processing.

Electronic memory machine 32 includes one or more physical devices configured to hold instructions executable by logic machine 30 to implement the methods and processes described herein. When such methods and processes are implemented, the state of electronic memory machine 32 may be transformed—e.g., to hold different data.

Electronic memory machine 32 may include removable and/or built-in devices. Electronic memory machine 32 may include semiconductor memory (e.g., RAM, EPROM, EEPROM, etc.), and/or magnetic memory. Electronic memory machine 32 may include volatile, nonvolatile, dynamic, static, read/write, read-only, random-access, sequential-access, location-addressable, file-addressable, and/or content-addressable devices.

It will be appreciated that electronic memory machine 32 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 30 and electronic memory machine 32 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer 28 implemented to perform a particular function. In some cases, a module, program, or engine may be instantiated via logic machine 30 executing instructions held by electronic memory machine 32. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, a display subsystem may be used to present a visual representation of data held by electronic memory machine 32. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with logic machine 30 and/or electronic memory machine 32 in a shared enclosure, or such display devices may be peripheral display devices.

When included, an input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, a communication subsystem may be configured to communicatively couple computer 28 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer 28 to send and/or receive messages to and/or from other devices via a network such as the Internet.

One aspect of this disclosure is directed to a camera comprising an objective portion, a sensor portion, and a computer. The objective portion is configured to collect light from a subject; it includes one or more alignment markers. The sensor portion is reversibly separable from the objective portion; it includes one or more optical sensor elements configured to sense the one or more alignment markers. The computer is configured to return an indication of alignment of the objective and sensor portions based on output of the one or more optical sensor elements.

In some implementations, each of the one or more alignment markers includes a light emitter. In some implementations, the camera further comprises one or more light emitters arranged in one or both of the objective portion and the sensor portion and configured to illuminate the one or more alignment markers. In some implementations, each of the one or more alignment markers includes a fluorescent material, and the light emitter is an ultraviolet emitter. In some implementations, each of the one or more alignment markers includes a reflector. In some implementations, the one or more alignment markers constitute a diffraction grating, and the light emitter is a laser. In some implementations, the objective portion includes a barrel lens system, and the one or more alignment markers are arranged on an end of the barrel lens system opposite the sensor portion. In some implementations, the objective portion and the sensor portion each includes one or more lenses, the one or more lenses of the objective portion are configured to collect the light from the subject, and the one or more lenses of the sensor portion are configured to receive and convey the light to an optical sensor array of the sensor portion. In some implementations, the one or more sensor elements are elements of an optical sensor array configured to capture an image of the subject. In some implementations, the one or more sensor elements are non-imaging sensor elements. In some implementations, the indication of alignment includes an indication of vertical alignment and an indication of horizontal alignment. In some implementations, the indication of alignment includes an indication of tilt alignment and/or focal alignment.

Another aspect of this disclosure is directed to an electronic device comprising an objective portion, a sensor portion, a computer, and a retaining member. The objective portion is configured to collect light from a subject; it includes one or more alignment markers. The sensor portion is reversibly separable from the objective portion; it includes one or more optical sensor elements configured to sense the one or more alignment markers. The computer is configured to return an indication of alignment of the objective and sensor portions based on output of the one or more optical sensor elements. The retaining member is configured to couple the objective portion to the sensor portion when the objective and sensor portions are aligned and also when the objective portion is separated from the sensor portion.

In some implementations, the retaining member includes a hinge. In some implementations, the retaining member includes a slide.

Another aspect of this disclosure is directed to a camera comprising an objective portion, a sensor portion, and a computer. The objective portion includes an aperture and is configured to collect light from a subject and to project an image of the aperture. The sensor portion is reversibly separable from the objective portion; it includes an array of optical sensor elements configured to capture the image of the aperture. The computer is configured to return an indication of alignment of the objective and sensor portions based on the image of the aperture as captured by the array of optical sensor elements.

In some implementations, the indication of alignment includes an indication of translational alignment, an indication of tilt alignment, and an indication of focal alignment. In some implementations, the indication of alignment varies based on a position of an elliptical center of the image of the aperture. In some implementations, the indication of alignment varies based on an elliptic eccentricity of the image of the aperture. In some implementations, the indication of alignment varies based on an elliptical diameter of the image of the aperture.

It will be understood that the configurations and/or approaches described herein are exemplary in nature, and that these specific embodiments or examples are not to be considered in a limiting sense, because numerous variations are possible. The specific routines methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A camera comprising:
an objective portion including an aperture, the objective portion configured to collect light from a subject and to project an image of the aperture;
a sensor portion reversibly separable from the objective portion, the sensor portion including an array of optical sensor elements configured to capture the image of the aperture;
a computer configured to return an indication of alignment of the objective and sensor portions based on the image of the aperture as captured by the array of optical sensor elements, the indication of alignment varying based on at least one of:
a position of an elliptical center of the image of the aperture,
an elliptic eccentricity of the image of the aperture, and
an elliptical diameter of the image of the aperture; and
a retaining member fixedly coupled to each of the objective and sensor portions and configured to couple the objective portion to the sensor portion both when the objective and sensor portions are aligned and when the objective portion is separated from the sensor portion.

2. The camera of claim 1 wherein the indication of alignment includes an indication of translational alignment.

3. The camera of claim 1 wherein the indication of alignment varies based on the position of the elliptical center of the image of the aperture.

4. The camera of claim 1 wherein the indication of alignment varies based on the elliptic eccentricity of the image of the aperture.

5. The camera of claim 1 wherein the indication of alignment varies based on the elliptical diameter of the image of the aperture.

6. The camera of claim 1 wherein the indication of alignment includes an indication of tilt alignment.

7. The camera of claim 1 wherein the indication of alignment includes an indication of focal alignment.

8. The camera of claim 1 wherein the indication of alignment includes an indication of vertical alignment.

9. The camera of claim 1 wherein the indication of alignment includes an indication of vertical alignment and an indication of horizontal alignment.

10. The camera of claim 1 wherein the objective portion and the sensor portion each includes one or more lenses.

11. The camera of claim 1 wherein the retaining member includes a hinge.

12. The camera of claim 1 wherein the retaining member includes a slide.

13. The camera of claim 1 wherein the image of the aperture includes the image of the subject, and wherein the image of the subject is formed on the array of optical sensor elements.

14. The camera of claim 1 wherein the aperture is a circular aperture.

15. The camera of claim 1 wherein the camera is arranged in a smartphone.

16. The camera of claim 1 wherein the camera is arranged in a tablet computer system.

17. A smartphone comprising:
an objective portion including an aperture, the objective portion configured to collect light from a subject and to project an image of the aperture;
a sensor portion reversibly separable from the objective portion, the sensor portion including an array of optical sensor elements configured to capture the image of the aperture;
a computer configured to return an indication of alignment of the objective and sensor portions based on the image of the aperture as captured by the array of optical sensor elements, the indication of alignment varying based on at least one of:
a position of an elliptical center of the image of the aperture,
an elliptic eccentricity of the image of the aperture, and
an elliptical diameter of the image of the aperture; and
a hinge fixedly coupled to each of the objective and sensor portions and configured to couple the objective portion to the sensor portion both when the objective and sensor portions are aligned and when the objective portion is separated from the sensor portion.

18. The smartphone of claim 17 wherein the image of the aperture includes the image of the subject, and wherein the image of the subject is formed on the array of optical sensor elements.

19. A smartphone comprising:
an objective portion including an aperture, the objective portion configured to collect light from a subject and to project an image of the aperture;
a sensor portion reversibly separable from the objective portion, the sensor portion including an array of optical sensor elements configured to capture the image of the aperture;
a computer configured to return an indication of alignment of the objective and sensor portions based on the image of the aperture as captured by the array of optical sensor elements, the indication of alignment varying based on at least one of:
a position of an elliptical center of the image of the aperture,
an elliptic eccentricity of the image of the aperture, and an elliptical diameter of the image of the aperture; and
a slide fixedly coupled to each of the objective and sensor portions and configured to couple the objective portion to the sensor portion both when the objective and sensor portions are aligned and when the objective portion is separated from the sensor portion.

20. The smartphone of claim 19 wherein the image of the aperture includes the image of the subject, and wherein the image of the subject is formed on the array of optical sensor elements.

* * * * *